No. 753,679. PATENTED MAR. 1, 1904.
J. C. DAVIS.
ADJUSTABLE DENTAL IMPRESSION CUP.
APPLICATION FILED APR. 6, 1903.
NO MODEL. 2 SHEETS—SHEET 1.
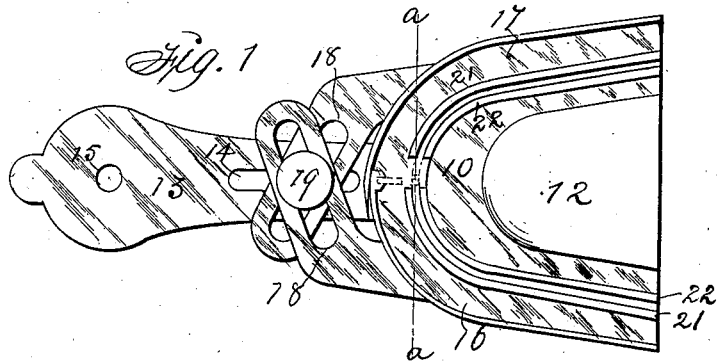
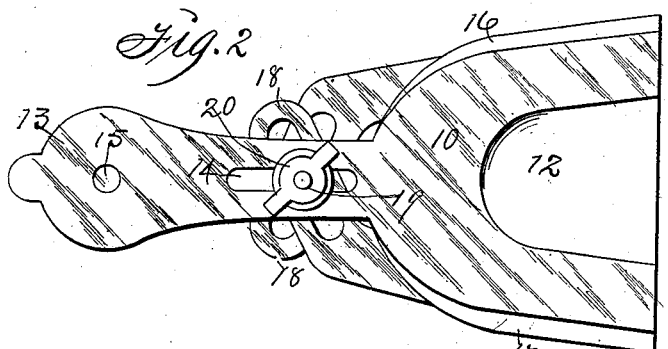
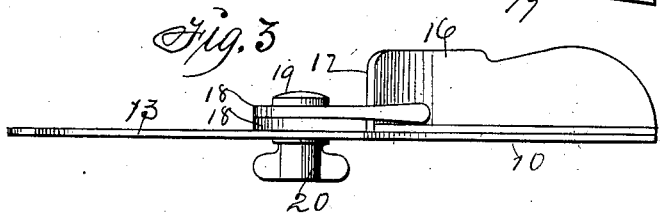
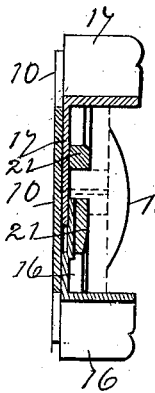
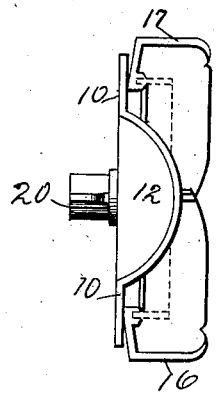
Witnesses:
F. F. Leibrock.
K. K. Keffer.
Inventor: John C. Davis,
By Thomas G. Orwig, Attorney.

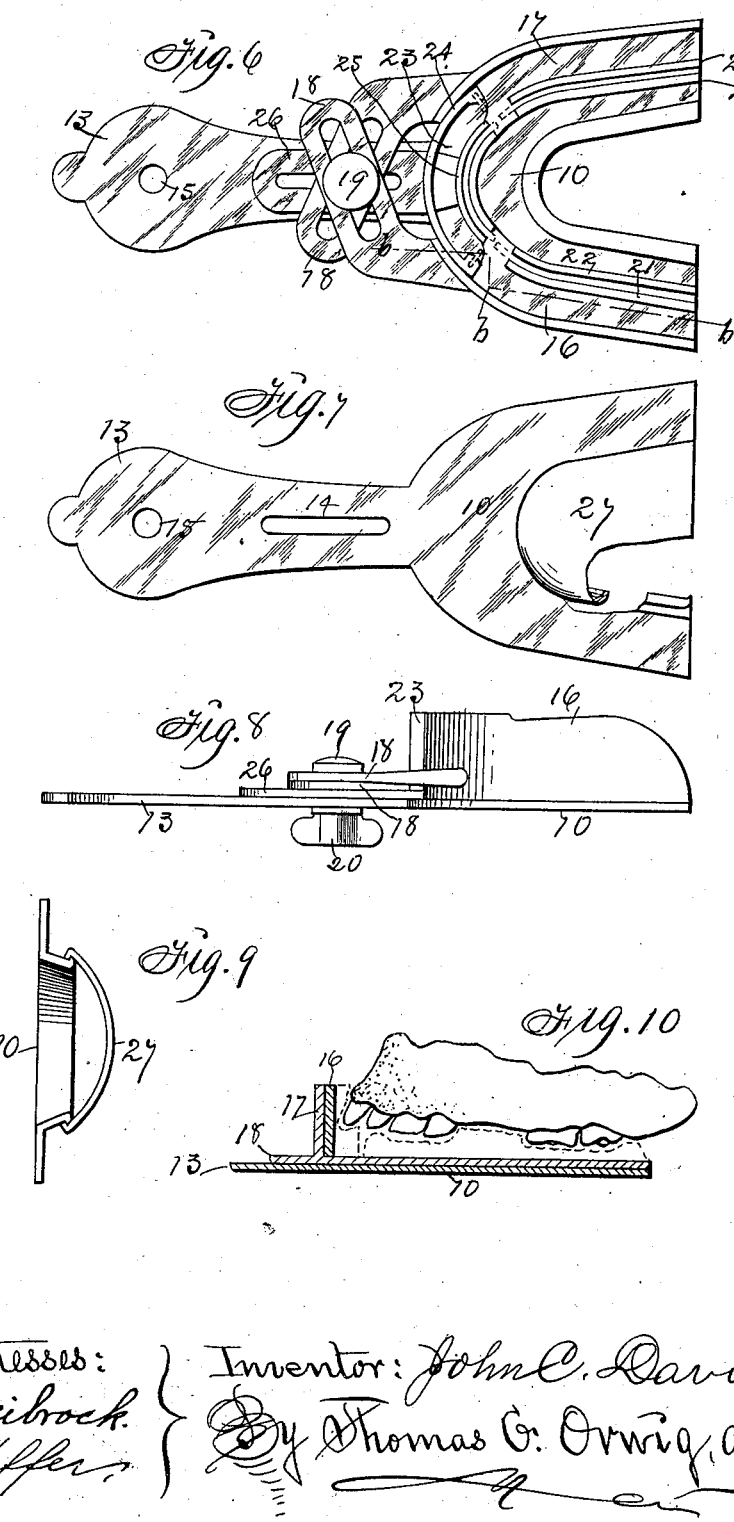

No. 753,679. Patented March 1, 1904.

UNITED STATES PATENT OFFICE.

JOHN C. DAVIS, OF REINBECK, IOWA.

ADJUSTABLE DENTAL IMPRESSION-CUP.

SPECIFICATION forming part of Letters Patent No. 753,679, dated March 1, 1904.

Application filed April 6, 1903. Serial No. 151,417. (No model.)

*To all whom it may concern:*

Be it known that I, JOHN C. DAVIS, a citizen of the United States, residing at Reinbeck, in the county of Grundy and State of Iowa, have invented a new and useful Adjustable Impression-Cup for Dentists, of which the following is a specification.

My object is, first, to provide an adjustable impression-cup adapted to be used advantageously for different persons of different age at different times; second, to dispense with the cost and care of numbers of impression-cups varying in size as required for use in taking impressions of different mouths for the purpose of making artificial dentures; third, to provide means for removing plaster molds from mouths in sections.

My invention consists in the construction and combination of parts as required to facilitate taking impressions, as hereinafter set forth, pointed out in my claims, and illustrated in the accompanying drawings, in which—

Figure 1 is a top view, and Fig. 2 a bottom view, of one of my adjustable cups composed of three principal parts adjustably connected, and Fig. 3 a side elevation of the same. Fig. 4 is a transverse sectional view on the line $a$ $a$ of Fig. 1, and Fig. 5 is an end view of Fig. 2. Fig. 6 is a top view, Fig. 7 a bottom view, and Fig. 8 a side elevation, of my adjustable impression-cup composed of four main parts and adapted for taking impressions of the upper and also the lower dentures in a person's mouth. Fig. 9 is an end view of Fig. 1, showing the dome in position for taking an impression of the upper jaw and teeth. Fig. 10 is a sectional view on the line $b$ $b$ of Fig. 6 and shows the position of the teeth relative to the wax and the plates of the impression-cup.

The numeral 10 designates the base-plate adapted for engagement with the roof of a person's mouth. It is semicircular in shape and raised at its broad end and center to produce a fixed dome 12 and is provided with a handle 13 at its front end. The handle has a longitudinal slot 14 at its central portion and an aperture 15 in its end portion.

Mating flat-bottomed plates 16 and 17, that conform in shape with the base-plate 10, are elbow-shaped in cross-section, as shown in Figs. 4 and 5, and each has a bridle 18 fixed thereto to project inward to extend across each other and also across the longitudinal slot 14 in the handle 13 in such a manner that they can be adjustably connected with each other and the base-plate 10 and securely fastened together by means of a screw 19 and a nut 20, as required to fit the cup to mouths of different size. Flanges 21 and 22 on the inner edges of the plates 16 and 17 produce a channel in which to place wax, and the inner end of the vertical portion of the plate 16 has an enlargement and a groove to admit pieces of wax, as indicated by dotted lines in Fig. 1, in such a manner that when the impressions are made in the plaster the mold produced will separate in front and at cutting edge of teeth, so it can be advantageously removed from the mouth in three parts.

To divide the cast or mold containing the impression made into four parts, a fourth plate 23, having concentric flanges 24 and 25, and a handle 26, provided with a longitudinal slot and enlargements at the ends of the other flange provided with vertical slots for the admission of wax, is applied, as shown in Figs. 6 and 7.

To adapt the impression-cup to be used alternately for an upper and a lower jaw, a dome 27 is detachably connected with the base-plate 10, that has a corresponding flanged opening, as shown in Figs. 7 and 9.

In practical use when the cup is properly adjusted for the mouth in which it is to be used and pieces of wax and plaster-of-paris placed therein the cup is placed in the mouth and plaster allowed to set in a common way as required to make a mold, and to remove the mold in separate parts the pressure of the nut on the screw that clamps the adjustable parts together must be relaxed, so they will separate and allow the mold to be taken out in three or four parts, as provided for. Dental palate-rubber, vulcanized, may be used in place of wax and in same manner.

The method of using this tray is practically the same as with any other tray in using plaster-of-paris. When using upper tray, (shown in Fig. 1,) the entire tray will be filled with plaster not only outside of dividing-wax, but on inside as well and over the dome 12, so that an impression is taken of the inner side of the teeth and the roof of the mouth at the same time that the outer impression is taken. All the plaster on the inside of the teeth and roof of the mouth is in one piece and adheres to the tray base or dome 12, the plaster outside of the teeth being separated from the inner portion by means of the wax at the cutting edge of the teeth, as shown in Fig. 10, and this outer plaster is divided into two or three parts, as case may be, by means of the wax on the plates 16 or 26, as the case may be. Lower impressions are taken in the same manner, the inside of the teeth being taken at same time that the outside is made, but with the exception that for the lower work no dome is used, and the opening in the base of the cup gives freedom to the tongue.

Having thus described the purpose of my invention and the construction and function of each part and the manner of combining and adjusting them, the practical operation and utility of my adjustable impression-cup will be readily understood by persons familiar with the art to which it pertains, and

What I claim as new, and desire to secure by Letters Patent, is—

1. In an adjustable dental impression-cup, a base-plate having a dome at one end and a handle at the other end and a longitudinal slot in the handle and two flanged plates, each having a bridle at its rear end portion adapted to overlie the slot in the handle of the base-plate, and means for clamping them together, arranged and combined to operate in the manner set forth for the purposes stated.

2. In an adjustable impression-cup, the combination of two mating plates that are elbow-shaped in cross-section and provided with concentric flanges at their inner edges, a third plate having flanges at its inner edges located between the ends of said mating plates, a base-plate and means for adjustably and detachably fixing them to the base-plate, for the purposes stated.

3. In an adjustable impression-cup, a plate that has a flange at its outer edge and an enlargement at one end provided with vertical flanges to produce a groove for the reception of wax, for the purposes stated.

4. In an adjustable impression-cup, a plate that has a flange at its outer edge and an enlargement at one end provided with vertical parallel flanges to produce a groove for the reception of wax and also parallel flanges on its top and inner edges to produce a groove extending horizontally from end to end of the plate, for the purposes stated.

5. An adjustable dental impression-cup comprising a base-plate having a dome at one end portion and a handle at its other end provided with a longitudinal slot, a plurality of plates that are elbow-shaped in cross-section and provided with concentric flanges on top of their inner edge portions and bridles extending rearward and a screw and nut, arranged and combined to operate in the manner set forth for the purposes stated.

JOHN C. DAVIS.

Witnesses:
JAMES D. MORRISON,
WM. F. JUNGER.